No. 783,267. PATENTED FEB. 21, 1905.
J. HARRIS.
BLAST CONTROLLING DEVICE FOR SEED CLEANERS.
APPLICATION FILED OCT. 15, 1904.

Witnesses
C. H. Olds
Geo. S. Cole

Inventor
Jonathan Harris
by Wm. M. Monroe
Attorney

No. 783,267. Patented February 21, 1905.

UNITED STATES PATENT OFFICE.

JONATHAN HARRIS, OF CLEVELAND, OHIO.

BLAST-CONTROLLING DEVICE FOR SEED-CLEANERS.

SPECIFICATION forming part of Letters Patent No. 783,267, dated February 21, 1905.

Application filed October 15, 1904. Serial No. 228,528.

*To all whom it may concern:*

Be it known that I, JONATHAN HARRIS, a citizen of the United States, and a resident of Cleveland, county of Cuyahoga, State of Ohio, have invented certain new and useful Improvements in Blast-Controlling Devices for Seed-Cleaners, of which I hereby declare the following to be a full, clear, and exact description, such as will enable others skilled in the art to which it appertains to make and use the same.

The objects of the invention are to provide a form of construction for the fan of the air-blast drum of a seed-cleaning machine by means of which the blast can be uniformly distributed throughout the sectional area of the vent-pipe, thus permitting a greater efficiency and thoroughness in the action of the blast upon the seed and greater practicability in the mode of application thereto, since without a uniform distribution of the blast throughout the mass of seed thus treated would be much reduced in quality and resulting value. When the air-drum is short, as in the smaller hand-driven machines, the want of uniform application of the air-blast is not obvious in effect; but in larger machines, where the air-drum is long, the effect of the fans is to force more air from the terminal openings of the drum into the air-pipe at the sides than at the center, where it is farther from the openings. To avoid this reduction in power at the center and to drive the entering air from both ends of the drum toward the center as well as at the sides of the blast-pipe, the peculiar form of vanes and fan-hub and gate in the discharge-pipe are employed as hereinafter described, shown in the accompanying drawings, and specifically pointed out in the claims.

Figure 1:
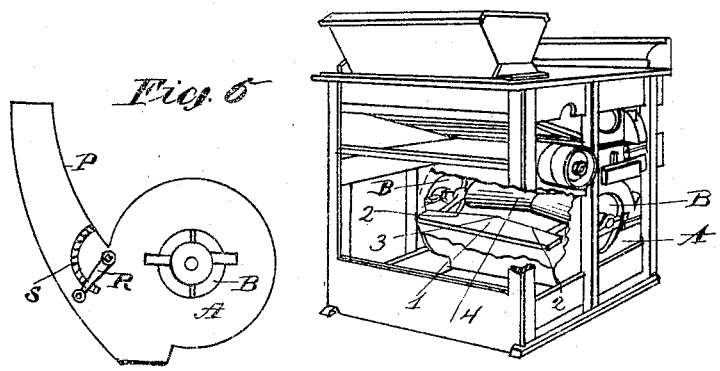
Figure 2:
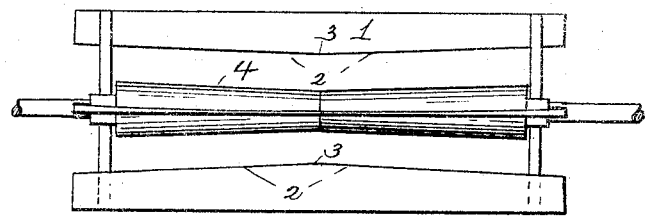
Figure 3:
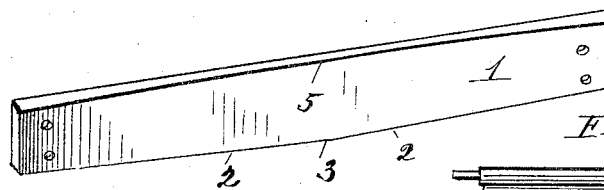
Figure 5:
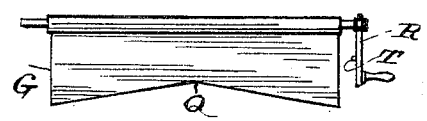
Figure 4:
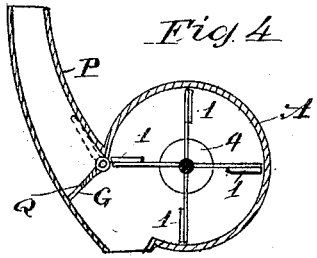

In the accompanying drawings, Figure 1 is a rear view of the machine, showing the sides of the air-drum broken away to disclose the fan. Fig. 2 is a side elevation of the fan-shaft and fan, showing the vanes and peculiar formation of the hub or axis. Here the several vanes are provided with lower edges which incline inwardly toward the center on their inner edges, and the hub or axis is hour-glass-shaped, a passage for the air-blast being left between the vanes and hub. Fig. 3 is a view showing one of the vanes provided with doubly-inclined lower edge and recessed front surface. Fig. 4 is a transverse section of the drum and blast-pipe. Fig. 5 is a detail of gate, and Fig. 6 is an elevation of drum.

In the views the vanes 1 are provided with straight outer edges and with doubly-inclined inner edges 2, the inclined portions of which meet at a broad angle at the center 3. The effect of this construction is to drive the air faster at the center than at the sides, and hence equalize the draft from the open ends of the drum and prevent the excessive draft at the ends of the fan. To increase the efficiency of this construction, an hour-glass shape is given to the doubly-conical hub 4, the sides of the cones being parallel with the inner edges of the vanes 1, thus modifying and reducing the volume of air at the ends. In addition to this inclination of the edges of the vanes the vanes may be recessed or curved inwardly at 5 on the forward surface, which will increase the aforesaid action thereof materially.

All or any one of the above-described features can be employed according to the size and requirements of the air-drum A and the sizes of its terminal openings B. I desire by these instrumentalities to obtain a far greater practicability and efficiency in action over the previous art as well as to obtain improved simplicity and greater economy in construction.

An important feature of this invention is found in the gate G, which is transversely pivoted in the lower end of the discharge-pipe P from the fan. This gate has a deep angular recess Q cut in its outer edge, the apex of the angle being in the center of the gate. The effect of this angular opening is to deflect the current of air toward the center and also to control the volume of air through the pipe, since this gate can be set at any desired angle. The pintle-rod on which the gate is hung extends through the wall of the pipe and by means of a cranked handle R and rack device S can be placed at any angle desired. A pin T engages the rack.

Having described the invention, what I claim as new, and desire to secure by Letters Patent, is—

1. In a seed-cleaning or analogous device, the combination with a cylindrical air-blast drum having a central air-inlet opening at each end, of a fan therein provided with vanes, each of such vanes having a straight outer edge, and a doubly-inclined inner edge, the inclined portions being united by a wide angle, and an axial drum for the fan, having a reverse inclination to that of the fan, the sides of the double cone thus formed being parallel with the inclined sides of the vanes, substantially as described.

2. In a seed-cleaning or analogous device, the combination with a cylindrical air-blast drum, having an air-inlet opening at each end, of a fan therein, provided with vanes, each of said vanes having a straight outer edge, and an inner edge doubly inclined from the center thereof toward the outer ends, and having a straight back and inwardly-curved front surface, substantially as described.

3. In a seed-cleaning or analogous machine, the combination with a cylindrical air-blast drum, having an air-inlet opening at each end, of a fan therein, provided with vanes, each of said vanes being formed of one piece and having the front surface recessed in a curve from end to end, substantially as set forth.

4. In a seed-cleaning device, the combination with an elongated cylindrical air-blast drum, having an air-inlet opening at each end, of a fan therein provided with vanes, each of said vanes being provided with instrumentalities for driving the air from the ends of the blast-cylinder toward the center comprising, doubly-inclined lower edges for each vane, and an inwardly-curved front surface, and a doubly-conical hub upon the axis of the fan, the sides of which are substantially parallel with the inclined edges of the vanes, substantially as described.

5. In a seed-cleaning device, the combination with the cylindrical air-blast drum having terminal air-inlet openings, of a discharge-passage therefrom, a fan in said drum adapted to force the air from said inlet-openings through said discharge-passage, and means for controlling the air delivered through said passage, consisting of a gate pivoted in said passage and provided with an angular recess in its outer edge, substantially as and for the purpose set forth.

6. In a blast-controlling means, the combination of a blast-pipe with a flat hinged valve therein, the said valve having a broad V-shaped recess on its outer edge, and means to adjust the said valve.

In testimony whereof I hereunto set my hand this 29th day of September, 1904.

JONATHAN HARRIS.

Witnesses:
Wm. M. Monroe,
Geo. O. Willet.